(12) United States Patent
Aoki et al.

(10) Patent No.: US 9,193,432 B2
(45) Date of Patent: Nov. 24, 2015

(54) STRATOSPHERIC STAY FACILITY

(75) Inventors: Takahira Aoki, Tokyo (JP); Yasuyuki Miyazaki, Funabashi (JP); Ryoji Sakai, Sakai (JP); Yoshiko Yoneyama, Tokyo (JP)

(73) Assignee: SAKASE ADTECH CO., LTD., Sakai-shi, Fukui (JP)

( * ) Notice: Subject to any disclaimer, the term of this patent is extended or adjusted under 35 U.S.C. 154(b) by 0 days.

(21) Appl. No.: 13/876,342

(22) PCT Filed: Sep. 28, 2010

(86) PCT No.: PCT/JP2010/066858
§ 371 (c)(1),
(2), (4) Date: Jun. 24, 2013

(87) PCT Pub. No.: WO2012/042600
PCT Pub. Date: Apr. 5, 2012

(65) Prior Publication Data
US 2013/0264413 A1    Oct. 10, 2013

(51) Int. Cl.
*B64B 1/50* (2006.01)
*B64B 1/30* (2006.01)

(52) U.S. Cl.
CPC .... *B64B 1/50* (2013.01); *B64B 1/30* (2013.01)

(58) Field of Classification Search
CPC .............. B64B 1/02; B64B 1/60; B64B 1/22; B64B 1/40; B64B 1/50; B61B 7/00; B64C 37/02
USPC .......... 244/24–33, 96–99, 115–116, 125–128
See application file for complete search history.

(56) References Cited

U.S. PATENT DOCUMENTS

| 282,060 A | * | 7/1883 | Debayeux | .................... 244/73 R |
| 691,719 A | * | 1/1902 | Greth | .............................. 244/33 |

(Continued)

FOREIGN PATENT DOCUMENTS

| DE | 4431576 A1 | 3/1996 |
| DE | 20 2007 007 652 U1 | 9/2007 |

(Continued)

OTHER PUBLICATIONS

Graham Warwick, "Higher Ground: Stratospheric airships special report", Flight International, Aug. 15, 2006. Accessed from http://www.flightglobal.com/news/articles/higher-ground-stratospheric-airships-special-report-208385/ on Jun. 20, 2014.*

(Continued)

*Primary Examiner* — Tien Dinh
*Assistant Examiner* — Alexander V Giczy
(74) *Attorney, Agent, or Firm* — Westerman, Hattori, Daniels & Adrian, LLP (57) ABSTRACT

There is provided a stratospheric stay facility that allows humans to stay in the stratosphere in the altitude range of 15 to 25 kilometers. The stratospheric stay facility includes a structure for stay 10 having a cabin in which an environment allowing humans to stay in it is maintained and having resistance to pressure in an environment at a highest altitude at which the structure for stay is kept flying, airships 20 that are adapted to be capable of ascending to the sky by buoyancy and lifts the structure for stay 10 to keep it flying in the stratosphere in the altitude range of 15 to 25 kilometers, and first mooring cables 50 and second mooring cable 80 each of which has a first end fixed to the structure for stay 10 and a second end fixed to the ground to moor the structure for stay 10.

16 Claims, 6 Drawing Sheets

(56) References Cited

U.S. PATENT DOCUMENTS

| | | | |
|---|---|---|---|
| 889,693 A * | 6/1908 | Lake | 244/30 |
| 2,950,881 A * | 8/1960 | Schwoebel | 244/31 |
| 4,085,912 A * | 4/1978 | Slater | 244/25 |
| 4,581,897 A * | 4/1986 | Sankrithi | 60/641.12 |
| 5,857,654 A * | 1/1999 | Berman | 248/441.1 |
| 6,224,015 B1 * | 5/2001 | Reinhard | 244/24 |
| 6,422,506 B1 * | 7/2002 | Colby | 244/1 TD |
| 2001/0002686 A1 | 6/2001 | Yokomaku et al. | |
| 2002/0109045 A1 * | 8/2002 | Beach et al. | 244/33 |
| 2002/0167702 A1 * | 11/2002 | Badesha et al. | 359/172 |
| 2009/0152391 A1 * | 6/2009 | McWhirk | 244/30 |
| 2009/0184196 A1 * | 7/2009 | Price | 244/33 |

FOREIGN PATENT DOCUMENTS

| | | |
|---|---|---|
| JP | 05-0007600 U | 2/1993 |
| JP | 2000-095196 A | 4/2000 |
| JP | 2001-199397 A | 7/2001 |
| JP | 2010-202148 A | 9/2010 |

OTHER PUBLICATIONS

L. David, R. Citron, T. Rogers & C. D. Walker, Apr. 25-28, 1985, "The Space Tourist", AAS 85-771 to -774. Proceedings of the Fourth Annual L5 Space Development Conference held Apr. 25-28, 1985, in Washington, D.C. Accessed from http://www.spacefuture.com/archive/the_space_tourist.shtml on May 2, 2014.*

Gregory Kennedy, "Stratolab, an Evolutionary Sratospheric Balloon Project", page generated Nov. 25, 2008. Accessed from https://web.archive.org/web/20090813113949/http://stratocat.com.ar/artics/stratolab-e.htm on Jun. 23, 2014; date of archival Aug. 13, 2009.*

Ahmed Khairy Noor, Samuel L. Venneri, "Future Aeronautical and Space Systems," AIAA, 1997, p. 239. Accessed from http://books.google.com/books?id=uuR5yBwvhsQC&pg=PA239&dq=tethered+stratospheric+airship&hl=en&sa=X&ei=UNKoU-CaN9TesASpn4CgBQ&ved=0CCAQ6AEwAQ#v=onepage&q=tethered%20stratospheric%20airship&f=false on Jun. 20, 2014.*

Global Near Space Services, "What is Near Space?", http://www.globalnearspace.com/definition.shtml, accessed Sep. 2, 2014. Archieved by the Internet Archive on Feb. 16, 2009, https://web.archive.org/web/20090216173027/http://globalnearspace.com/definition.shtml, accessed Sep. 2, 2014.*

International Search Report of PCT/JP2010/066858, mailing date of Oct. 26, 2010.

Office Action dated Apr. 4, 2015, issued in corresponding German Patent Application No. 11 2010 005 912.8 with English translation (9 pages).

* cited by examiner

STRATOSPHERIC STAY FACILITY

TECHNICAL FIELD

The present invention relates to a stratospheric stay facility that allows humans to stay in the stratosphere in the altitude range of 15 to 25 kilometers.

BACKGROUND ART

Recently, there have been made studies and developments of systems that use an airship kept flying in the stratosphere in the altitude range of 15 to 25 kilometers, in which weather conditions are relatively stable, for the purpose of communication, broadcast, and earth observation. (See patent documents 1 and 2).

Although aircrafts capable of flying in the stratosphere have been developed, technologies that allow humans to stay in the stratosphere for a long period of time have not been known.

PRIOR ART DOCUMENTS

Patent Documents

Patent Document 1: Japanese Patent Application Laid-Open No. 2000-95196
Patent Document 2: Japanese Patent Application Laid-Open No. 2001-199397

SUMMARY OF THE INVENTION

Problems to be Solved by the Invention

An object of the present invention is to provide a stratospheric stay facility that allows humans to stay in the stratosphere in the altitude range of 15 to 25 kilometers.

Means for Solving the Problem

To achieve the above object, the present invention employs the following means.

A stratospheric stay facility according to the present invention comprises:

a structure for stay having a cabin in which an environment in which humans can stay is maintained and having resistance to pressure in an environment at a highest altitude at which the structure for stay is kept flying;

a flying body that is adapted to be capable of ascending to the sky by buoyancy and lifts the structure for stay to keep the structure for stay flying in the stratosphere in the altitude range of 15 to 25 kilometers; and a mooring member that has a first end fixed to the structure for stay or the flying body and a second end fixed to the earth to moor the structure for stay.

It should be understood that, the expression "a first end fixed to the structure for stay or the flying body" means that the first end of the mooring member may be fixed to the structure for stay or the flying body, or alternatively, to a part that connects the structure for stay and the flying body.

According to the present invention, the structure for stay is kept flying in the stratosphere in the altitude range of 15 to 25 kilometers by the flying body and moored by the mooring member. This enables humans to stay in the cabin of the structure for stay, in which an environment in which humans can stay is maintained. It is sufficient for the structure for stay to be adapted to fly at a desired altitude in the range of 15 to 25 kilometers and to have resistance to pressure in the environment at the highest altitude at which the structure for stay is kept flying.

It is preferred that the flying body be adapted to be capable of moving in vertical and horizontal directions and that there be a plurality of flying bodies that pull the structure for stay in different directions to control the position and inclination of the structure for stay.

Controlling the position and inclination of the structure for stay by a plurality of flying bodies enables to maintain a comfortable condition in the cabin.

It is preferred that at least one of a first mooring cable having an end that is fixed to a cable connecting the flying body and the structure for stay and a second mooring cable having an end that is fixed to the structure for stay be used as the mooring member.

It is preferred that the stratospheric stay facility further include a gondola that has a cabin in which an environment in which humans can stay is maintained, has resistance to pressure in an environment at an altitude at which the structure for stay is kept flying, and can move on the second mooring cable between the earth and the structure for stay.

With this configuration, people can move between the earth and the structure for stay using the gondola with the structure for stay left flying in the stratosphere. Therefore, the cost of transporting people to the stratosphere and back to the earth can be reduced.

It is preferred that the stratospheric stay facility further include a flying body for driving the gondola that is adapted to be capable of ascending to the sky by buoyancy and lifts the gondola to move it to the structure for stay.

In some embodiments, it is preferred that the second end of the mooring member be fixed to the ground.

This enables the structure for stay to be kept flying at a nearly constant position.

In some embodiments, it is preferred that the second end of the mooring member be fixed to a ship on the sea.

With this feature, the structure for stay can be moved in the stratosphere, and the position and inclination of the structure for stay can be controlled by moving the ship.

It is preferred that a lift generating part that generates lift be provided on at least one of the structure for stay and the flying body.

With this feature, not only the buoyancy of the flying body but also lift generated by the lift generating part can be utilized as force for lifting the structure for stay. This can lead to a reduction in the number and size of the flying bodies. Moreover, the size of the structure for stay, the maximum weight of the people and baggage on the structure for stay, and the altitude at which the structure for stay is kept flying can be increased more easily.

Advantageous Effect of the Invention

As described above, the present invention enables humans to stay in the stratosphere in the altitude range of 15 to 25 kilometers.

EMBODIMENTS FOR CARRYING OUT THE INVENTION

In the following, embodiments for carrying out the present invention will be described with reference to the accompanying drawings. The dimensions, materials, shapes, relative arrangements, and other features of the components that will be described in connection with the embodiments are not intended to limit the scope of the present invention only to them, unless particularly stated.

First Embodiment

Overall Construction of Stratospheric Stay Facility

Figure 1:
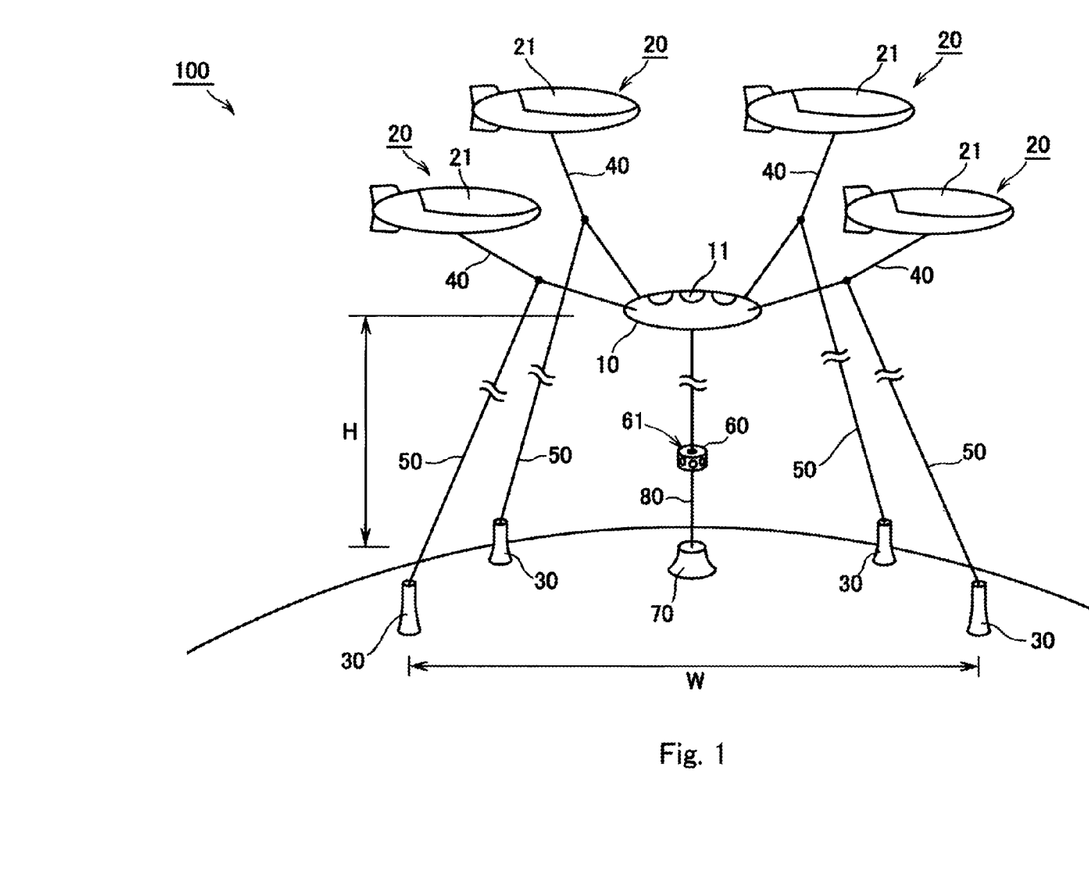
FIG. 1 is a view of a stratospheric stay facility according to a first embodiment of the present invention, seen obliquely from above.

The overall construction of a stratospheric stay facility according to a first embodiment of the present invention will be described with reference to FIGS. 1 and 2.

It is known that weather conditions are relatively stable in the stratosphere in the altitude range of 15 to 25 kilometers. A stratospheric stay facility 100 according to this embodiment is a facility that allows humans to stay in the stratosphere in the altitude range of 15 to 25 kilometers, in which weather conditions are relatively stable. The stratospheric stay facility 100 includes a structure for stay (or residential structure) 10 and a plurality of airships 20, which are flying bodies used to keep the structure for stay 10 flying in the stratosphere. The stratospheric stay facility 100 further includes first mooring cables 50 and a second mooring cable 80 as mooring members used to moor the structure for stay 10. In this embodiment, a case where the altitude of the highest position at which the structure for stay 10 is kept flying is 25 kilometers will be described by way of example.

<Structure for Stay>

Figure 4:
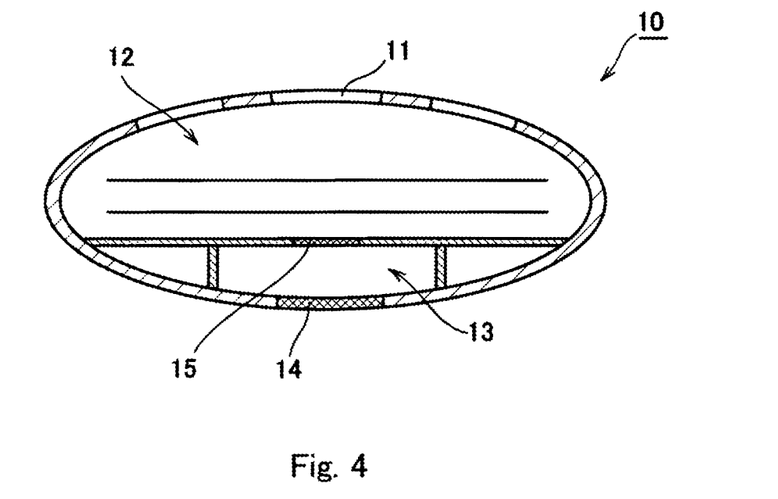
FIG. 4 is a diagram illustrating the inner structure of the structure for stay according to the first embodiment of the present invention.

The structure for stay 10 has, in its interior, a cabin 12 in which an environment allowing humans to stay in it is maintained (see FIG. 4). The structure for stay 10 is provided with equipment that controls the temperature, humidity, and pressure to maintain such an environment (or comfortable environment) in the cabin 12 that is suitable in terms of temperature, humidity, and pressure for humans to stay in it. The structure for stay 10 has a countermeasure against cosmic and ultraviolet rays to prevent people staying in the cabin 12 from being harmfully affected under cosmic and ultraviolet ray conditions in the stratospheric environment in the altitude range of 15 to 25 kilometers (height H in FIG. 1). The structure for stay 10 has resistance to pressure at least in the environment at an altitude of 25 kilometers so that it is durable in the stratospheric environment in the altitude range of 15 to 25 kilometers. In cases where the altitude of the highest position at which the structure for stay 10 is kept flying is not 25 kilometers but lower than 25 kilometers, e.g. in cases where the altitude of the highest position is 20 kilometers, it is sufficient that the structure for stay 10 has resistance to pressure at least in the environment at an altitude of 20 kilometers. This also applies to the countermeasure for cosmic and ultraviolet rays.

Known technologies relating to the fuselage of aircrafts that can fly at an altitude of 25 kilometers can be applied to the structure for stay 10 having a cabin 12 in which an environment allowing humans to stay in it is maintained and having pressure resistance in the environment at an altitude of 25 kilometers. A desirable size of the structure for stay 10 is as large as the fuselage of a supersize aircraft (having a diameter of approximately six meters, a length of approximately 60 meters, and a full three-story structure, for example). The structure for stay 10 according to the embodiment has a plurality of windows 11 provided on the top to allow people staying therein to have a view of the sky.

<Flying Body (Airship)>

In this embodiment, four airships 20 are used to lift the structure for stay 10 by cables 40, thereby keeping the structure for stay 10 flying in the stratosphere in the altitude range of 15 to 25 kilometers. The airships 20 may be known airships that are designed to be capable of flying in the stratosphere. The airship 20 is adapted to be capable of moving in vertical and horizontal directions. The airship 20 need not be provided with facilities inside it that allow a human to stay in it so long as the flight thereof can be controlled. The airship 20 according to the embodiment has a solar cell 21 provided in the top portion so that it can provide all or part of the energy for driving the airship 20. The gas used to provide the lift (or buoyancy) of the airship 20 may be hydrogen or helium gas. The use of hydrogen gas is desirable from the viewpoint of cost.

The airships 20 are used not only to bring the structure for stay 10 from the ground to the stratosphere and from the stratosphere to the ground but also to control the position and inclination of the structure for stay 10. In this embodiment, ends of the cables 40 are fixed to the structure for stay 10 at four positions including two front positions and two rear positions, and the other ends (or second ends) of the cables 40 are fixed to the airships 20 respectively, so that the structure of stay 10 is pulled in four directions. This configuration enables control of the position and inclination of the structure for stay 10 by controlling the position of four airships 20 (see FIG. 2).

In this embodiment, the structure for stay 10 is adapted to be pulled from four directions. In order to control the position and inclination of the structure for stay 10, it is desirable that the structure for stay 10 be pulled from at least three directions. The structure for stay 10 may be pulled from five or more directions. While in this embodiment one flying body (i.e. airship 20) is used to pull the structure for stay 10 in each direction, two or more flying bodies (airships 20) may be used to pull the structure for stay 10 in each direction. In the latter case, cables branched from one cable fixed to the structure for stay may be used, and each of the branch cables may be fixed to a flying body (airship 20).

The flight of each of the plurality of flying bodies (airships 20) may be controlled by communication or other means from the structure for stay 10 or from the ground.

<Mooring Member>

The first mooring cables 50 and the second mooring cable 80 are used as mooring members for mooring the structure for stay 10 in the stratospheric stay facility 100 according to the embodiment.

One end of each first mooring cable 50 is fixed to a cable 40 that connects the airship 20 and the structure for stay 10, and the other end (or second end) is fixed to a foundation 30 provided on the ground. There are four cables 40, and one first mooring cable 50 is provided for each of the four cables 40. The foundations 30 are arranged with an interval (W in FIG. 1) between adjacent foundations 30 of 5 to 30 kilometers. One end of the second mooring cable 80 is fixed to the structure for stay 10, and the other end (or second end) is fixed to a foundation 70 provided on the ground.

As described above, the structure for stay 10 is moored by the four first mooring cables 50 and one second mooring cable 80. This arrangement can keep the structure for stay 10 flying at a nearly constant position.

<Means for Transporting Humans>

It is possible to transport humans from the ground to the stratosphere or from the stratosphere to the ground by towing the structure for stay 10 with them aboard by the four airships 20. However, in the case where the structure for stay 10 is as large as the fuselage of a supersize aircraft, it is very cost-consuming to move the structure for stay 10 itself frequently by the airships 20.

In this embodiment, there is provided a gondola 60 that can move on the second mooring cable 80 between the ground and the structure for stay 10. As with the structure for stay 10, the gondola 60 has a cabin 61 in which an environment allowing humans to stay in it is maintained and has resistance to pressure in the environment at least at an altitude of 25 kilometers. In cases where the altitude of the highest position at which the structure for stay 10 is kept flying is not 25 kilometers but lower than 25 kilometers, it is sufficient that the gondola 60 has resistance to pressure at least in the environment at an altitude at which the structure for stay 10 is kept flying. This also applies to the countermeasure for cosmic and ultraviolet rays.

The transportation of people using gondola 60 enables to transport them to the structure for stay 10 in the stratosphere and from the structure for stay 10 to the ground while leaving the structure for stay 10 flying in the stratosphere, leading to cost reduction. As means for moving the gondola 60 on the second mooring cable 80, suitable known technologies may be employed. Here, an exemplary case where small airships are used as flying bodies for driving the gondola will be described with reference to FIG. 3.

Figure 3:
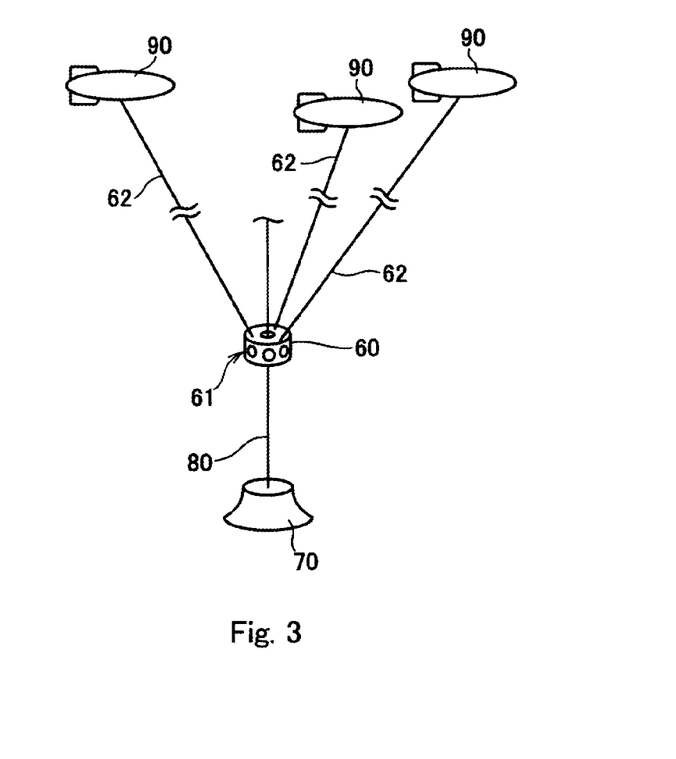
FIG. 3 illustrates a way of moving a gondola in the stratospheric stay facility according to the first embodiment of the present invention.

In the exemplary case shown in FIG. 3, the gondola 60 is moved up/down by three small airships 90 connected with the gondola 60 by respective cables 62. The gondola 60 is smaller and lighter in weight as compared to the structure for stay 10, and it can be moved up/down by the small airships 90.

When people move from the gondola 60 to the cabin 12 of the structure for stay 10 or from the cabin 12 of the structure for stay 10 to the gondola 60, it is necessary that they be not exposed to the atmosphere in the stratosphere. To this end, the structure for stay 10 has a pressure adjustment room provided adjacent to the cabin 12.

In the following, the pressure adjustment room will be described with reference to FIG. 4. FIG. 4 shows the inner structure of the structure for stay 10. The pressure adjustment room 13 has a first openable/closable door 14 leading to the outside of the structure for stay 10 and a second openable/closable door 15 leading to the cabin 12. When both the first openable/closable door 14 and second openable/closable door 15 are closed, the pressure adjustment room 13 is a closed space, and the pressure adjustment room 13 is adapted in such a way that the pressure in it adjustable. When the gondola 60 is brought into the structure for stay 10, the gondola 60 is brought into the pressure adjustment room 13 with only the first openable/closable door 14 on the outer side being open. Thereafter, the first openable/closable door 14 on the outer side is closed, and the pressure in the pressure adjustment room 13, which is then a closed space, is adjusted to a pressure under which humans can stay (approximately 1 atm). Thereafter, the second openable/closable door 15 on the cabin 12 side is opened, allowing people to move from the gondola 60 to the cabin 12. When the gondola 60 is moved from the structure for stay 10 to the ground, the second openable/closable door 15 on the cabin 12 side is closed, and then the first openable/closable door 14 on the outer side is opened.

Alternatively, the gondola 60 and the structure for stay 10 may be connected directly (or docked) with their interior airtightly isolated from the outside atmosphere to allow people to move between the gondola 60 and the structure for stay 10.

Advantages of this Embodiment

The stratospheric stay facility 100 according to this embodiment enables humans to stay in the stratosphere in the altitude range of 15 to 25 kilometers. Controlling the position and inclination of the structure for stay 10 by a plurality of flying bodies (airships 20) can provide a comfortable environment for stay.

Figure 2:
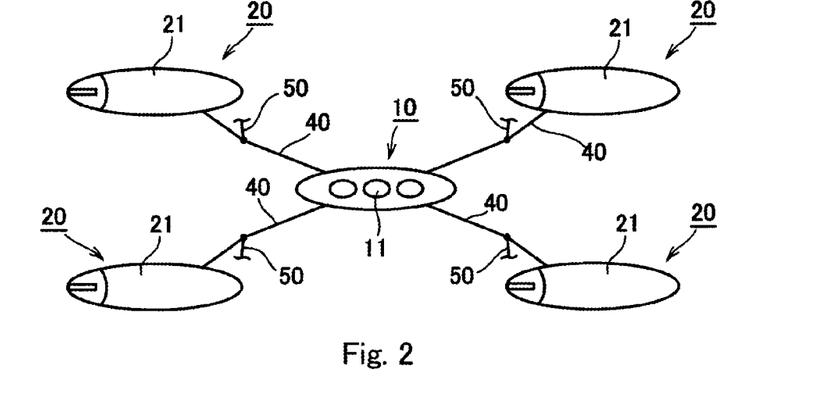
FIG. 2 is a view of the stratospheric stay facility according to the first embodiment of the present invention, seen from above.

In this embodiment, the structure for stay 10 is provided with windows 11 on its top, and people staying in the structure for stay 10 can have a view of the sky from the stratosphere, because their view of the sky is not obstructed by the airships 20, as will be seen from FIG. 2. Providing further windows on the sides and bottom of the structure for stay 10 will allow people to have a view of the surface of the earth.

Allowing people to stay for a long period of time, the stratospheric stay facility 100 according to this embodiment can be used for the purpose of earth observation, astronomical observation, and various experiments as well as sightseeing and lodging. It may also be used as a base from/on which manned and unmanned aircrafts take off/alight.

Second Embodiment

Figure 5:
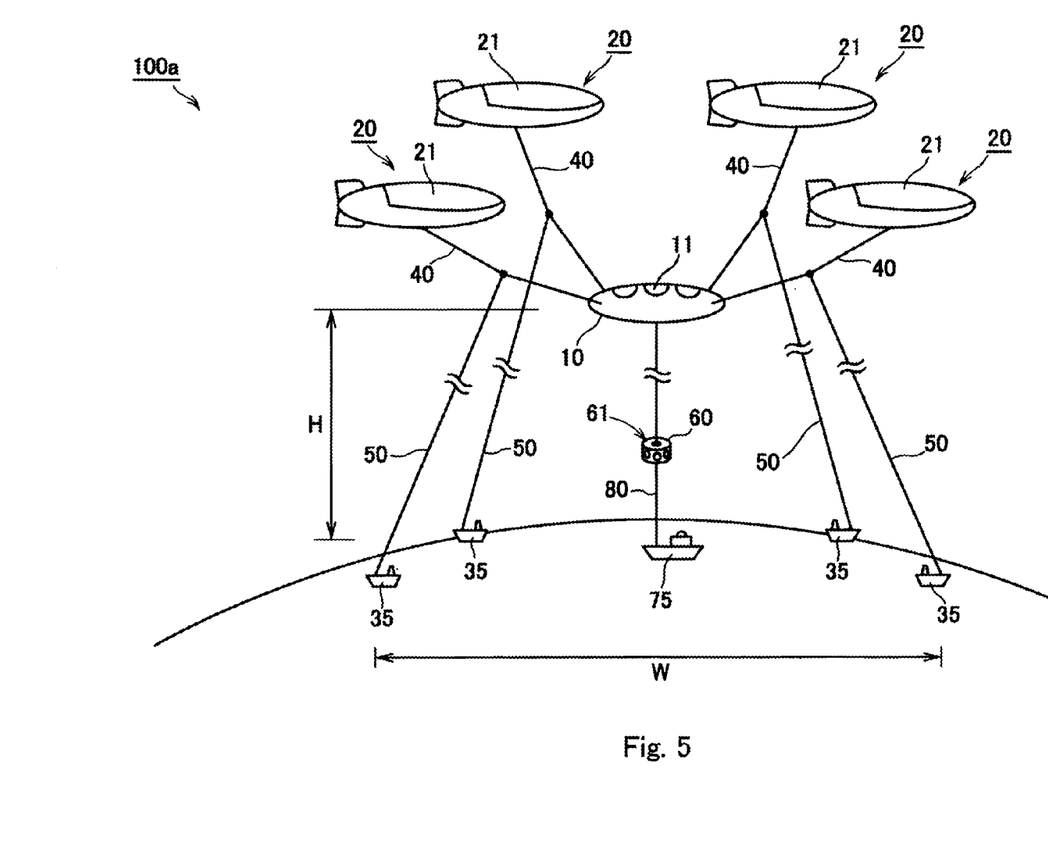
FIG. 5 is a view of a stratospheric stay facility according to a second embodiment of the present invention, seen obliquely from above.

A stratospheric stay facility according to a second embodiment of the present invention will be described with reference to FIG. 5. While in the above-described first embodiment the second ends of the mooring cables are fixed to the ground, in this embodiment the second ends of the mooring cables are fixed to ships on the sea. The other features are the same as those in the first embodiment, and the same components will be denoted by the same reference numerals and will not be described further.

In the stratosphere stay facility 100a according to this embodiment, the second ends of the first mooring cables 50 are fixed to ships 35 on the sea, and the second end of the second mooring cable 80 is also fixed to a ship on the sea. The other arrangements are the same as those in the above-described first embodiment.

With the above feature, in this embodiment, the position and inclination of the structure for stay 10 can be controlled by moving the ships 35, 75 in cooperation with the four airships 20. In addition, the structure for stay 10 can be moved in the stratosphere by moving the ships 35, 75 in cooperation with the four airships 20.

Third Embodiment

Figure 6:
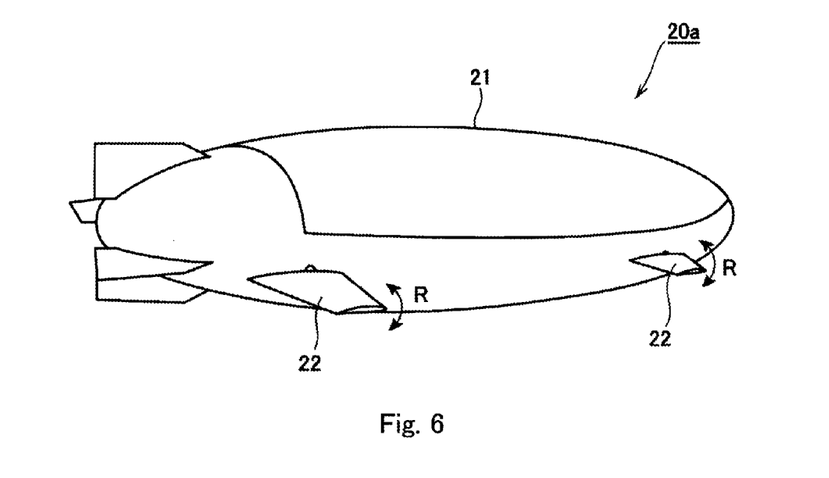
FIG. 6 is a perspective view of a flying body according to a third embodiment of the present invention.

A flying body according to a third embodiment of the present invention will be described with reference to FIG. 6. While in the above-described first and second embodiments, the flying body (airship) ascends only by the buoyant force, in this embodiment the flying body is provided with lift generating parts. The features other than the flying body are the same as those in the first and second embodiments and will not be described further.

The airship 20a as a flying body according to this embodiment is provided with wings 22 as lift generating parts. In this embodiment, the wings 22 are provided symmetrically at each of two positions of front and rear to make a total of 4 wings 22. The construction of the airship 20a is the same as the airship 20 in the above-described first embodiment except for the provision of the four wings 22, and the same portions will not be further described.

In this embodiment, the wings 22 are ultralight wings such as inflatable wings. They can be swung in the direction indicated by arrows R in FIG. 6 under control. When the wings 22 are swung in such a way as to directly face the direction of the wind, they can generate lift.

As described above, the airship 20a as a flying body according to this embodiment can utilize as lifting force lift generated by the wings 22 in addition to the buoyant force. This can increase the force for lifting the aforementioned structure for stay 10 by the airships 20a. In consequence, the number of the airships 20a and/or the size of the airships 20a can be reduced. Moreover, the size of the structure for stay 10, the maximum weight of the people and baggage on the structure for stay 10, and the altitude at which the structure for stay 10 is kept flying can be increased more easily. The positions at which the wings 22 are provided and the number of the wings 22 are not limited to those described above.

Fourth Embodiment

Figure 7:
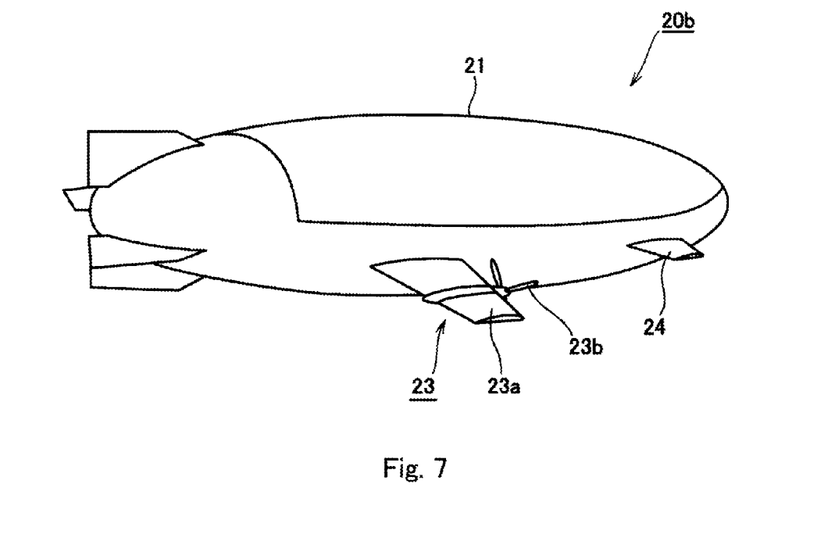
FIG. 7 is a perspective view of a flying body according to a fourth embodiment of the present invention.

A flying body according to a fourth embodiment of the present invention will be described with reference to FIG. 7. While in the above-described first and second embodiments, the flying body (airship) ascends only by the buoyant force, in this embodiment the flying body is provided with lift generating parts. The features other than the flying body are the same as those in the first and second embodiments and will not be described further.

The airship 20b as a flying body according to this embodiment is provided with main wings 23 and ailerons 24 as lift generating parts. In the airship 20a according to this embodiment, the main wings 23 are provided symmetrically at a central position with respect to the front-rear direction, and the ailerons 24 are provided symmetrically at a front position. The construction of the airship 20b is the same as the airship 20 in the above-described first embodiment except for the provision of the main wings 23 and ailerons 24, and the same portions will not be further described.

The wings 23 and the ailerons 24 are ultralight wings such as inflatable wings. The main wings 23 are equipped with propellers 23b that blow air to the body 23a of the main wings 23.

The airship 20b according to this embodiment having the above-described construction can generate lift by the main wings 23 and the ailerons 24 utilizing natural wind, and in addition it can positively generate lift by blowing air to the main wings 23 by the rotation of the propellers 23b.

As described above, this embodiment can also achieve the advantageous effects same as the above-described third embodiment. In the case of this embodiment, lift can be generated only by blowing air to the main wings 23 by the rotation of the propellers 23b, without utilizing natural wind. The ailerons 24 may also be equipped with propellers.

Fifth Embodiment

Figure 8:
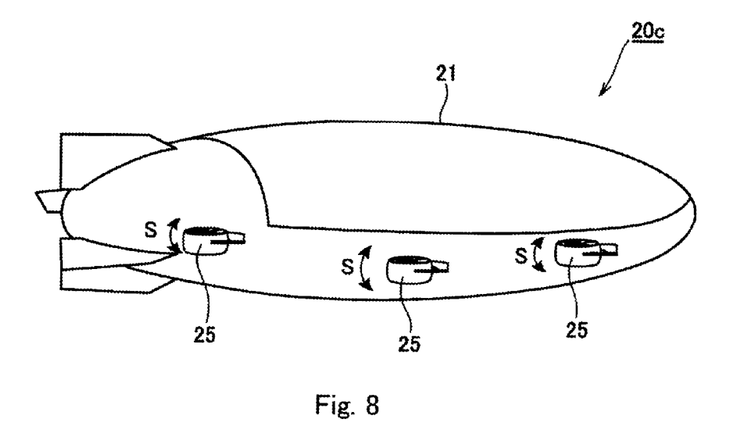
FIG. 8 is a perspective view of a flying body according to a fifth embodiment of the present invention.
Figure 9:
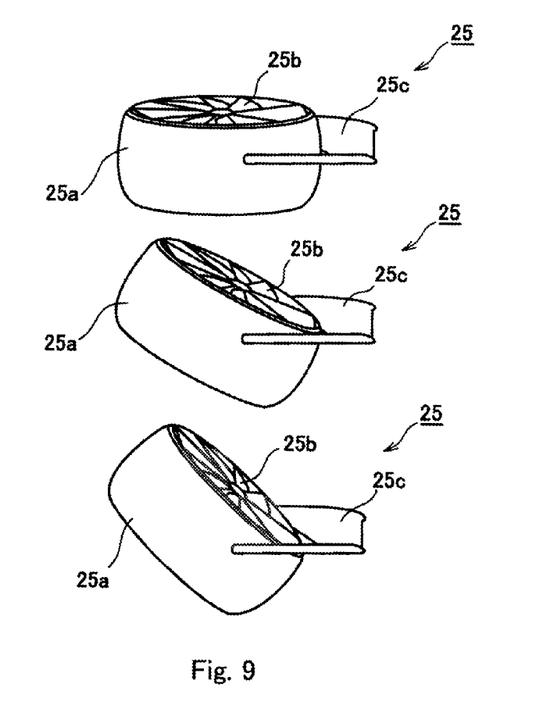
FIG. 9 illustrates the operation of a lift generating part in the flying body according to the fifth embodiment of the present invention.

A flying body according to a fifth embodiment of the present invention will be described with reference to FIGS. 8 and 9. While in the above-described first and second embodiments, the flying body (airship) ascends only by the buoyant force, in this embodiment the flying body is provided with lift generating parts. The features other than the flying body are the same as those in the first and second embodiments and will not be described further.

The airship 20c as a flying body according to this embodiment is provided with ducted fans 25 as lift generating parts. In this embodiment, the ducted fans 25 are provided symmetrically at each of three positions of front, rear, and central to make a total of 6 ducted fans. The construction of the airship 20c is the same as the airship 20 in the above-described first embodiment except for the provision of the six ducted fans 25, and the same portions will not be further described.

The ducted fan 25 has a cylindrical part 25a, a fan 25b provided in the cylindrical part 25a, and a support part 25c that supports the cylindrical part 25a. The cylindrical part 25a is supported by the support part 25c in such a way that it can pivot in the direction indicated by arrows S in FIG. 8 relative to the support part 25c, and the orientation of the cylindrical part 25a can be controlled. FIG. 9 illustrates how the orientation of the cylindrical part 25a is changed.

The airship 20c according to this embodiment having the above-described construction can generate airflow through the cylindrical parts 25a by the rotation of the fans 25b. Thus, the airship 20c can generate lift by the ducted fans 25 in addition to buoyant force, as force for ascending.

As described above, this embodiment can also achieve the advantageous effects same as the above-described third embodiment. In this embodiment, the direction of lifting force generated by each of the ducted fans 25 can be regulated by controlling the pivoting of the cylindrical part 25a. This enables control of the inclination of the airship 20c. The positions at which the ducted fans 25 are provided and the number of the ducted fans 25 are not limited to those described above.

(Others)

While in the embodiments described in the foregoing, the flying bodies used to lift the structure for stay 10 and the flying bodies used to move the gondola 60 up and down are airships, balloons may be used as the flying bodies, alternatively. When balloons are used to lift the structure for stay 10, they may be provided with various lift generating parts as described in the third, fourth, and fifth embodiments. The flying bodies used to move the gondola 60 up and down can also be provided with lift generating parts.

There is no limitation on the number of flying bodies (airships 20 and/or balloons), so long as they can generate lift that is needed to keep the structure for stay 10 at a desired altitude and can control the position and inclination of the structure for stay 10. The structure for stay 10 may be lifted not only by airships 20 or not only by balloons but also by airships 20 and balloons.

A flying body may be provided with different types of lift generating parts described in the third to fifth embodiments. For example, an airship may be provided with wings 22 described in the third embodiment and ducted fans described in the fifth embodiment. In this way, the lift generating parts described in these embodiments may be employed in appropriate combinations as desired.

While in the third to fifth embodiments the lift generating parts are provided on the airships serving as flying bodies, the lift generating parts may be provided on the structure for stay 10 described in the first and second embodiments. The lift generating parts may be provided only on the flying bodies or only on the structure for stay 10. Alternatively, the lift generating parts may be provided on both the flying bodies and the structure for stay 10. However, in the case of the lift generating parts described in the third embodiment, it is necessary that the wings 22 face the wind directly in order to generate lift, and therefore it is also necessary to change the orientation of the structure for stay 10. This is not desirable, because a complex system for changing the orientation of the structure for stay 10 is needed. Moreover, since the lift generating parts can make noise, it is desirable that they be provided only on the flying bodies from the viewpoint of comfort for people staying in the structure for stay 10. Moreover, from the viewpoint of maintenance it is preferred that the parts that generate buoyant force or lift be provided on one of them, and it is desirable that the lift generating parts be provided only on the flying bodies.

DESCRIPTION OF THE REFERENCE SIGNS

10: structure for stay
11: window
12: cabin
13: pressure adjustment room
14: first openable/closable door
15: second openable/closable door
20, 20a, 20b, 20c: airship
21: solar cell
22: wing
23: main wing
23a: body of main wing
23b: propeller
24: aileron
25: ducted fan
25a: cylindrical part
25b: fan
25c: support part
30: foundation
35: ship
40: cable
50: mooring cable
60: gondola
61: cabin
62: cable
70: foundation
75: ship
80: mooring cable
90: small airship
100, 100a: stratospheric stay facility

The invention claimed is:

1. A stratospheric stay facility comprising:
a structure for stay having a cabin in which an internal environment in which humans can stay is maintained and having resistance to pressure in an external environment at a highest altitude at which the structure for stay is kept flying;
a plurality of flying bodies that are adapted to ascend to the sky by buoyancy and lift said structure for stay to keep said structure for stay flying in the stratosphere in the altitude range of 15 to 25 kilometers;
wherein each one of said flying bodies is adapted to move in vertical and horizontal directions, and wherein said plurality of flying bodies pull said structure for stay in different directions to control position and inclination of said structure for stay;
wherein said plurality of flying bodies include three or more flying bodies that are distributed around the periphery of said structure for stay and wherein each of said plurality of flying bodies are each adapted to move independently from each other of said plurality of flying bodies so as to control said position and inclination of the structure for stay by independently controlling said plurality of flying bodies; and
a plurality of mooring members arranged to moor said structure for stay, said plurality of mooring members including a plurality of first mooring cables that each has a first end fixed to a respective connecting cable connecting one of said flying bodies and said structure for stay and a second end fixed to the Earth to moor said structure for stay.

2. A stratospheric stay facility according to claim 1, wherein said plurality of mooring members include a second mooring cable that is fixed to said structure for stay.

3. A stratospheric stay facility according to claim 2, further comprising a gondola that has a cabin in which an internal environment in which humans can stay is maintained, has resistance to pressure in an external environment at an altitude at which said structure for stay is kept flying, and can move on said second mooring cable between the Earth and said structure for stay.

4. A stratospheric stay facility according to claim 3, further comprising another flying body for driving the gondola, wherein said another flying body is adapted to be capable of ascending to the sky by buoyancy and lifts said gondola to move said gondola to said structure for stay.

5. A stratospheric stay facility according to claim 2,
wherein said plurality of first mooring cables extend between said connecting cables connecting said flying bodies and said structure for stay and respective ones of a plurality of foundations on the ground or sea and said second mooring cable extends between said structure for stay and another foundation on the ground or sea.

6. A stratospheric stay facility according to claim 5, wherein said plurality of foundations on the ground or sea include an interval between adjacent foundations of at least 5 km.

7. A stratospheric stay facility according to claim 1, wherein said second ends of said first mooring cables are fixed to the ground.

8. A stratospheric stay facility according to claim 1, wherein said second ends of said first mooring cables are each fixed to a ship on a sea.

9. A stratospheric stay facility according to claim 1, wherein a lift generating part that generates lift is provided on at least one of said structure for stay and said flying bodies.

10. A stratospheric stay facility according to claim 1, wherein said plurality of flying bodies are energy powered air ships having independent drives that independently move said air ships.

11. A stratospheric stay facility according to claim 10, wherein said air ships are remotely controlled via a communication device.

12. A stratospheric stay facility according to claim 10, wherein said independent drives include lift generators.

13. A stratospheric stay facility according to claim 12, wherein said lift generators include propellers or fans.

14. A stratospheric stay facility comprising:
- a structure for stay having a cabin in which an internal environment in which humans can stay is maintained and having resistance to pressure in an external environment at a highest altitude at which the structure for stay is kept flying;
- a plurality of flying bodies that are adapted to ascend to the sky by buoyancy and lift said structure for stay to keep said structure for stay flying in the stratosphere in the altitude range of 15 to 25 kilometers;
- said plurality of flying bodies being distributed around the periphery of said structure for stay and independently connected to said structure for stay, each of said plurality of flying bodies being adapted to move positions independently from each other of said plurality of flying bodies so as to control said position and inclination of the structure for stay by independently controlling positions of said plurality of flying bodies;
- said plurality of flying bodies being each connected to said structure for stay via independent connecting cables;
- a plurality of mooring members arranged to moor said structure for stay, wherein said plurality of mooring members including a plurality of first mooring members that connect between respective ones of said independent connecting cables and respective ones of a plurality of foundations on the ground or sea and a second mooring member that is fixed to said structure for stay and that connects to another foundation on the ground or sea.

15. A method of using a stratospheric stay facility, comprising:
a) providing a stratospheric stay facility having:
- a structure for stay having a cabin in which an internal environment in which humans can stay is maintained and having resistance to pressure in an external environment at a highest altitude at which the structure for stay is kept flying;
- a plurality of flying bodies that are adapted to ascend to the sky by buoyancy and lift said structure for stay to keep said structure for stay flying in the stratosphere in the altitude range of 15 to 25 kilometers;
- said plurality of flying bodies each being connected to said structure for stay via independent connecting cables;
- a plurality of mooring members arranged to moor said structure for stay, said plurality of mooring members including a plurality of first mooring members connecting between respective ones of said independent connecting cables and respective ones of a plurality of foundations on the ground or sea;

b) having said flying bodies ascend to the sky by buoyancy and lift said structure for stay to the stratosphere in the altitude range of 15 to 25 kilometers;

c) with said structure for stay at said altitude range of 15 to 25 kilometers, having said mooring members moor said structure for stay;

d) said flying bodies being adapted to be capable of moving in vertical and horizontal directions, and having a plurality of said flying bodies pull said structure for stay in different directions to control position and inclination of said structure for stay.

16. The method of claim 15, further including:
providing at least three of said flying bodies distributed around the periphery of said structure for stay and independently connected to said structure for stay via respective ones of said independent connecting cables, and independently controlling positions of said at least three flying bodies.

* * * * *